F. G. BARNES.
AUTOMATIC SAFETY CONTROLLER FOR PERMANENT WAY LOCOMOTIVES AND THE LIKE.
APPLICATION FILED SEPT. 29, 1914.

1,216,049.

Patented Feb. 13, 1917.

INVENTOR
Franklin George Barnes
BY
ATTORNEYS

UNITED STATES PATENT OFFICE.

FRANKLIN GEORGE BARNES, OF WYNNUM SOUTH, NEAR BRISBANE, QUEENSLAND, AUSTRALIA, ASSIGNOR TO BARNES TRAIN STOP COMPANY, LIMITED, OF BRISBANE, AUSTRALIA.

AUTOMATIC SAFETY-CONTROLLER FOR PERMANENT-WAY LOCOMOTIVES AND THE LIKE.

1,216,049.

Specification of Letters Patent.

Patented Feb. 13, 1917.

Application filed September 29, 1914. Serial No. 864,056.

*To all whom it may concern:*

Be it known that I, FRANKLIN GEORGE BARNES, residing at Homewold, Walnut street, Wynnum South, near Brisbane, State of Queensland, Commonwealth of Australia, a subject of the King of Great Britain, have invented certain new and useful Improvements in Automatic Safety-Controllers for Permanent-Way Locomotives and the like, of which the following is a specification.

This invention relates to improved devices on locomotives whereby air or other fluid pressure brakes are automatically actuated should the train run past a specially devised warning obstruction which with or without a signal is set at "danger". At the same time the invention automatically registers the time at which the locomotive or the like runs past such "danger" signal or obstruction, this registration being both audible and visible to the engine-driver in the cab of the locomotive or the like. The invention also provides permanent record of the number of the locomotive which contacted with the obstruction. The invention also provides means for re-setting the appliances after an operation. The invention also provides means for controlling the parts so that when there are two obstructions set on the track the exhaust valve will only be operated from the obstruction when the engine runs past such obstruction in the direction for which it is set at danger.

In the following specification the invention is described as being operated by air which is intended to mean compressed air or other fluid pressure.

The device for accomplishing the above objects includes:—

First—a part which is hereinafter referred to as the "obstruction" and which is positioned between the rails of the track, and worked in conjunction with the signal so that when the signal is set at "danger" the obstruction assumes a vertical position and thereby operates the brake and recording systems above and hereinafter referred to. The flexibility and size of the obstruction is so proportioned as to allow the obstruction to be deflected and permit the striking arm of the locomotive after making the record impression on one of the faces to pass.

Second—an automatic exhaust valve attached to the bogie plate or other suitable equivalent part of the locomotive where its movement relative to the rails is unaffected or least affected by the engine springs. Its action is to open to atmosphere by means of striking arms and parts the brake pipe containing air or other elastic fluid under pressure, when the obstruction has come into contact and operation. At the same time the said striking arms by means of raised markings on coming into contact with a lead or soft metal surface, provided on the obstruction make a permanent register of the number of the locomotive upon the said obstruction.

Third—the automatic brake valve operator part situated in the cab of the locomotive in such a position as to form an extension of or connection to the usual form of driver's air brake valve. When the obstruction operates the exhaust valve the air in the cylinder of the brake valve operator is released and thereby causes a movement of a piston which by mechanical means rotates the driver's air brake valve handle and thus automatically applies the air brakes in the same manner as manually effected by the engine-driver under ordinary circumstances.

Fourth—the automatic register part which is fastened in the cab of the locomotive in a convenient position, its function being to automatically register the time at which the exhaust valve is opened and the brakes applied by the engine over-running the signal or obstruction set at "danger", and also the time at which the exhaust valve is re-set by the engine-driver, thus giving a complete record by means of permanent marks on prepared disks.

Fifth—the automatic warning whistle consisting of a pipe which allows the exhaust air from the exhaust valve when operated by the obstruction as described to pass through a shrill whistle fixed in a convenient place in the cab of the engine and thus warn the driver that his locomotive has passed a danger signal.

Sixth—the re-setting appliance which comprises a three-way cock which has connections from the main air reservoir to the re-setting valve and automatic register, and from the automatic register and re-setting valve to atmosphere, and by means of which after the automatic exhaust valve has been operated, said valve can be re-set by the fluid from the main air reservoir operating a small re-setting valve which restores the exhaust valve to its normal position and at the same time, actuates the automatic register, thereby recording the time of such re-setting.

Seventh—the automatic direction control. This part is bolted and keyed to the locomotive bogie axle and by means of a loose collar, a split sheave, coil springs, crank arms, and other parts as hereinafter further described the levers controlling the exhaust valve are automatically moved according to the direction of motion of the locomotive, so that the exhaust valve will only be actuated from the obstruction when the engine runs past such obstruction in the direction for which it is set at "danger" in conjunction with the signal device.

For the purpose of more clearly demonstrating the construction and working of the several parts reference is hereinafter made to the drawings showing one preferred form of my invention.

Figure 3:
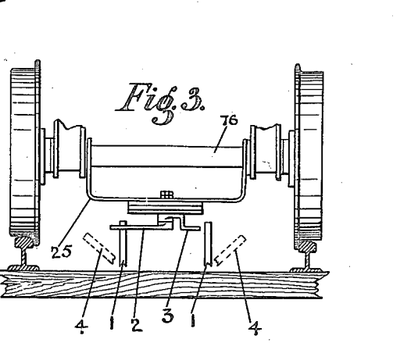
Fig. 3 is a diagrammatic view of the bogie frame of a locomotive showing both the obstructions in "safety" and "danger" positions and the lever arms which operate the exhaust valve, all other parts being omitted for the sake of clearness.

Two obstructions 1 are fitted as shown in Fig. 3 one at each side of the track. These obstructions may be operated and controlled by suitable cords and rods from the signals and they assume a vertical position when respective signals are at "danger." When the obstructions are in this vertical position and the engine passes them, one of the obstructions contacts with either one of the striking arms 2 or 3 according to setting and the direction in which the engine is running and thereby actuates parts as hereinafter described. The striking arms 2 and 3 may have raised markings on them so as to leave a record impression on a soft metal facing removably attached to or connected with the obstruction. When the signal is set at "safety" the obstruction falls into position of inaction as shown at 4, and all parts of the locomotive are clear of same when traveling over them.

Figures 11, 12, 13, 14, 15, 16, 17, 18:
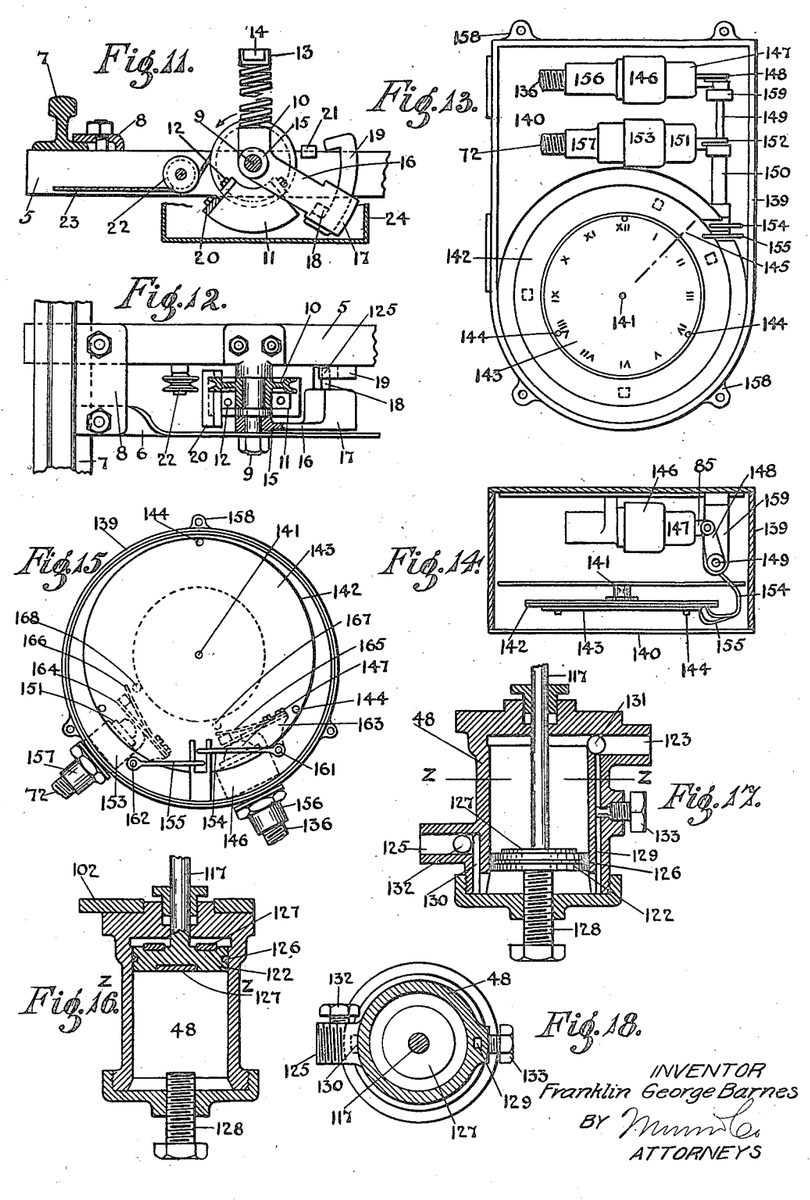
Figs. 11 and 12 are elevation and plan respectively of the preferred form of "obstruction."
Fig. 13 is a front elevation of automatic registering device.
Fig. 14 is a plan of parts shown in Fig. 13.
Fig. 15 is a front view of alternative modified form of automatic registering device.
Fig. 16 is a sectional elevation of automatic brake operator cylinder.
Fig. 17 is a sectional elevation of same taken at right angles to Fig. 16.
Fig. 18 is a sectional plan of same taken on the line Z—Z of Figs. 16 and 17.

One of the obstructions with portion of signal attachments is illustrated in Figs. 11 and 12, in which 5 is an angle iron support and 6 a bar both of which are secured to the rail 7 by means of a clip 8, and form a support for the pin 9. This pin carries a grooved sheave 10 with a weighted part 11, fixed thereto by bolts 12. The obstruction is preferably formed as shown with a spring like portion and a rectangular solid top 13, which may have soft metal faces 14, attached thereto. Each obstruction has a boss 15 which is free to move about pin 9 and is also formed as shown with extension 16, weighted end 17, and projection 18, which works between the gap of a quadrant 19. A bar 20 is attached to weighted part 11 of grooved sheave 10. 21 is a stop for the bar 20. 22 is a guide sheave for wire rope 23 leading to signal. 24 is the case for inclosing the gearing.

The obstruction has only a range of movement as determined by the projection 18 and quadrant 19, the weighted end 16 being so placed that when left to itself the obstruction will always assume a vertical position. The wire 23 is attached to the weight lever of an ordinary signal by clips or the like, so that when the semaphore is at danger the obstruction is vertical. When the semaphore is being lowered by the signalman pulling against the balance weight, the wire 23 rotates the sheave 10 (in direction of arrow in Fig. 11) thus carrying around the balance weight 11. After rotating through a predetermined angle the bar 20 comes into contact with the extension 16 and thereafter the obstruction is rotated along with the sheave 10; this continues until either the signal ceases to move, or the bar 20 comes against the stop 21. In any case the obstruction cannot move farther than the quadrant 19 allows it, on account of the projection 18. This movement of the obstruction however is sufficient to cause the striking arms 2 or 3 on the locomotive to move past without touching 1. If desired the obstruction may be operated by means independent of the signaling device, as for instance in emergency circumstances and by any convenient means such as by a wedge under the weighted part.

Referring now particularly to the exhaust valve and Figs. 7, 8, and 9—25 is a plate attached to the bogie frame or other convenient part of a locomotive, and fitted with a central spindle 26. This spindle carries the striking arms 2 and 3, which are formed with suitable bosses 27 and 28 and cams 29 and 30, used for operating the exhaust valve. When the engine is at rest, the striking arms 2 and 3 will occupy the positions as shown in these figures, and are held by the damping springs 31 and 32, which are fastened to the columns 33, 34, secured to plate 25. 35 is a ring which is attached to plate 25 by means of bolts 36, and thereby forms an annular groove which receives the rings 39 and 40, which are fitted with fingers 41 and 42. These fingers are connected by rods 43 and 44, to the automatic direction control hereinafter referred to. 45 and 46 are buffers attached to the plate 25 by means of bolts 47. These buffers are fitted with pads or faces 49 of copper or like soft material and receive the impact of the striking arms 2 and 3, when either of such strike one or the other of the obstructions. 51 and 52 are coil springs attached to the bosses of striking arms 2 and 3, and serve to restore these arms to their normal positions.

Figure 10:
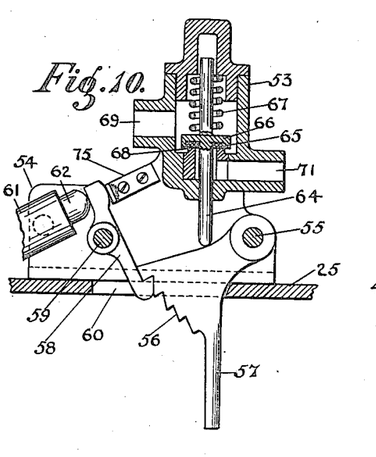
Fig. 10 is a detail partly in section showing automatic exhaust valve, re-setting valve and parts.

53 is the automatic exhaust valve main casting attached by bracket 54 to plate 25. 55 is a pin which is secured to 53 and carries a ratchet segment 56 formed with a vertical bar piece 57. 58 is a pawl which engages ratchet 56 and is mounted on pin 59. 60 is a hole made in plate 25 to allow movement of pawl. 61 is the resetting cylinder with piston 62, and coupling 63. This cylinder is bolted to bracket 54. The exhaust valve is shown in detail in Fig. 10. 53 is the main body casting, 64 the valve spindle, 65 seating of leather or the like, 66 the valve disk. 67 spiral spring pressing disk 66 on to seat 68. 69 is air inlet coupling connected by pipe 70 (Fig. 2) to the automatic operator cylinder hereinafter referred to. 71 is air outlet coupling leading by pipe 72 (Figs. 1 and 2) to warning whistle 73 and automatic register 74. 75 is a U shaped or other spring for keeping pawl 58 engaged with ratchet.

Figure 5:
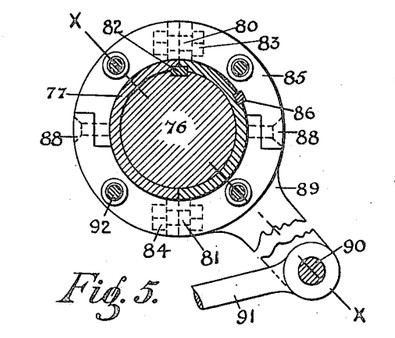
Fig. 5 is a sectional and end view of locomotive bogie axle with automatic direction control clutch fixed thereon.
Figure 6:
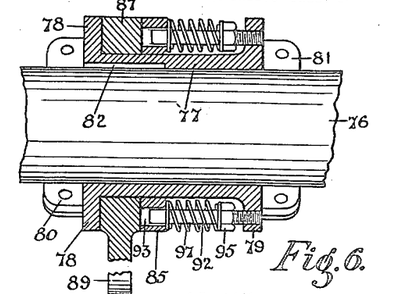
Fig. 6 is a section through x—x in Fig. 5.
Figure 7:
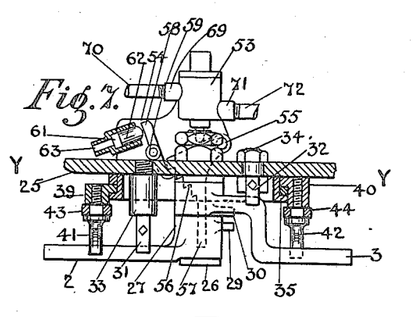
Fig. 7 is an end sectional elevation showing the automatic exhaust valve, the re-setting valve, and details in conjunction therewith.

The automatic control (Figs. 5 and 6) for moving that horizontal striking arm which is situated on the right hand side of the center line of the locomotive, in relation to its direction of motion so that it does not come into contact with the corresponding obstruction, which is set on that side of the center line of the permanent way. 76 is the axle of the trailing bogie or other wheels of locomotive. 77 is a split casting which has flanged ends 78, 79, and lugs 80, 81. This split casting is fixed to axle 76 by means of a key 82 and the two halves of casting are secured together by the bolts 83, 84, which pass through the lugs 80, 81. 85 is a collar which is slidable on the split casting 77 and is prevented from rotating by means of a feather 86. 87 is a split casting the two halves of which are fastened together by means of screws 88. One half of this casting has an extended arm 89, which is connected at 90 to a rod 91 which operates the striking arms 2 and 3, and the exhaust valve in the manner hereinafter described. Four studs 92 are screwed at one end into the flanges 79 of the split casting 77, and at the other end enter holes 93, formed in the slidable collar 85. The studs 92 are provided with adjusting nuts 95, and coil springs 97 which press the collar 85 against the face of the split casting 87. This arrangement forms a friction clutch device whereby when the axle 76 is revolved the arm 89 is caused to rotate until it is restrained by an object sufficiently rigid to overcome the friction between the split casting 87 and slidable collar 85 caused by the springs: the split casting 87 then remains stationary, but the axle is free to revolve.

Figs. 1 to 6 illustrate the connections between the automatic direction control and the exhaust valve operating mechanism. 91 is a rod connected at one end by means of pin 90 to the arm 89 of the split casting 87, and at its other end to a cross head 169 by means of pin 170. This cross head block is slidable on a guide bar 171 which is fastened by means of bolts 172 to plate 25. 43 and 44 are bent rods swinging on steel pin 173 secured to cross head; these rods connect with rings 39 and 40 (Figs. 7 and 8) as hereinbefore described.

Figure 19:
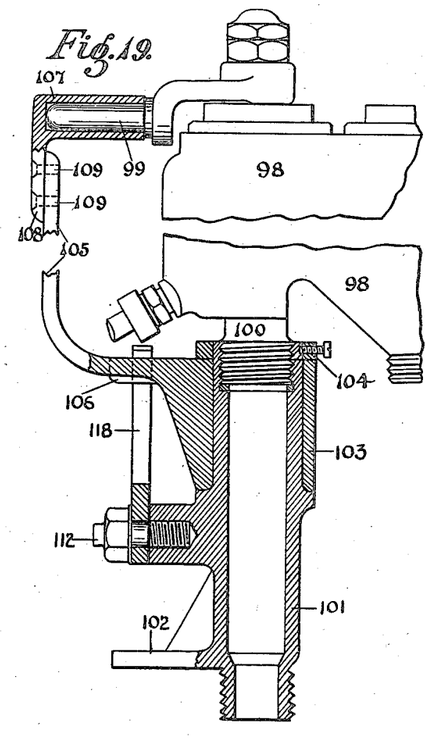
Fig. 19 is a view showing the driver's air brake valve casting with extension coupling and parts fitted thereto.
Figure 20:
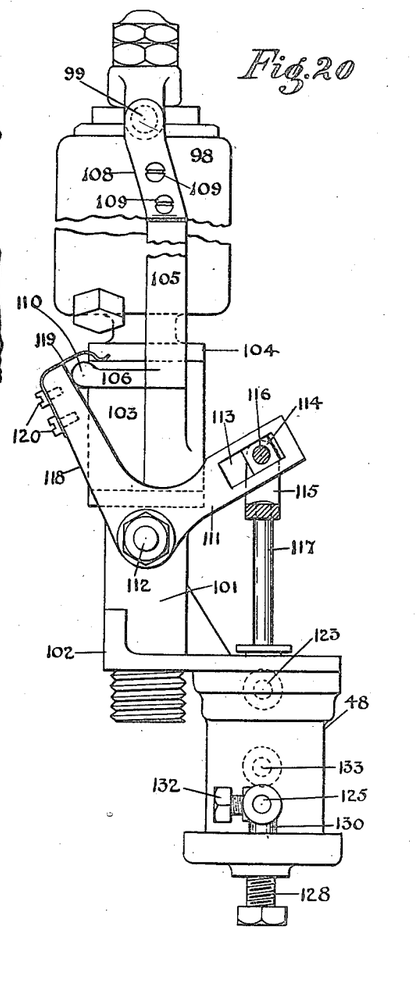
Fig. 20 is a view of parts shown in Fig. 19 taken at right angles thereto and showing the same attached to automatic air brake valve cylinder.
Figure 21:
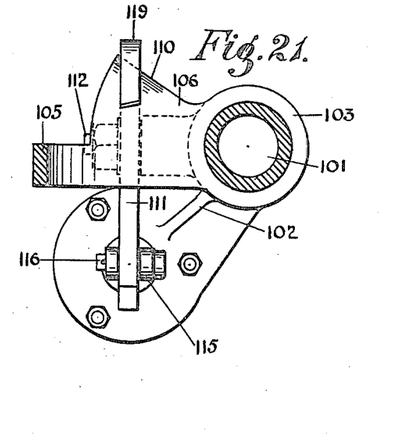
Fig. 21 is a plan of the parts shown in Figs. 19 and 20, with driver's air brake valve casing omitted.

Referring to Figs. 19, 20, and 21 which illustrate the automatic brake operator in detail, 98 is the air brake valve casting, 99 the driver's air brake handle, and 100 is the coupling on the brake valve casting leading to the main air reservoir. An extension coupling 101 with bracket 102 is screwed onto coupling 100 and is connected by piping in the ordinary manner to main air reservoir. The coupling 101 is fitted at its upper end with a rotatable sleeve 103 kept in position by a set collar 104. This sleeve has extending from it a bent arm 105 and a small brass quadrant 106 with a boss 110. 107 is a sleeve which is fitted over the driver's air brake valve handle 99. This sleeve has a downward projection 108 which is secured by means of screws 109, to the bent arm 105. The bell crank 111 is fulcrumed to the face of the extension coupling 101 by means of the pin 112. One arm of the crank 111 is slotted at 113 to receive a sliding steel block 114, which is connected by means of a suitable coupling 115 and pin 116 to the piston rod 117. The other arm 118 of the bell crank bears against the edge of the quadrant 106 and is fitted with a steel spring 119 kept in place by screws 120.

In the normal position of the driver's brake handle 99, the quadrant 106 is in the position shown in Fig. 20. When the driver desires to put his brake on manually he moves the handle 99 to either the ordinary brake application position, or the emergency position, both operations being carried out without in any way moving the crank arm 111—118 or spring 119. When the brake is automatically applied by the mechanism of the exhaust valve and auxiliary parts the crank arm 118 with spring 119 attached moves over from left to right pushing quadrant 106 before it, thus applying the brake in the same way as manually by the driver.

The travel which the crank arm 111—118 ordinarily has is sufficient to push the quadrant 106 with the brake handle attached, over into the ordinary brake application position. On reaching this position the curved end of the spring 119 has come down gently over the boss 110 thus preventing the quadrant from moving farther than the required brake application position, which it would otherwise do owing to momentum.

If the driver should, after the mechanism has automatically operated the air brake valve to the ordinary service application position, desire further to use the emergency application, all that is required is for him to push the handle into the emergency position. The slight pressure which he exerts in doing so releases the boss 110 from the end of spring 119.

If it is desired to provide that the automatic mechanism should bring the brake handle direct to the emergency position this can be done by increasing the downward travel of the piston rod 117 and crank arm attached thereto by means of set screws 128 (Fig. 20).

Referring particularly to Figs. 16, 17, and 18, 48 is the operator cylinder casting which is secured to the bracket 102 of the extension coupling 101. 122 is the reciprocating piston which may be formed integral with the rod 117. The upper part of the cylinder 48 is provided with a coupling 123 which is connected by suitable piping 124 with air main reservoir. The lower part has a coupling 125 and is connected by piping 70. 126 is a suitable piston ring, and 127 are rubber or leather disks attached to the top and bottom of piston 122 acting as buffers. 128 is an adjusting screw for regulating the downward stroke of the piston.

Ports 129, 130 are formed in the cylinder and regulating screws 131, 132, and 133 are provided for regulating the coupling openings 123 and 125 and the port 129.

Figure 2:
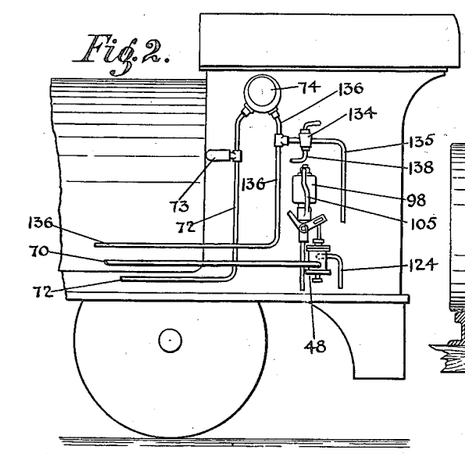
Fig. 2 is a diagrammatic view of the cab of a locomotive showing the relative positions of the automatic register, the automatic brake operator, the warning whistle and three-way cock.

When the exhaust valve is open, air will pass from main air reservoir along passage 129 and coupling pipe 70 through valve 53 and pipe 72 to the sounding whistle 73 and registering device 74 (Fig. 2).

A three-way cock 134 is placed in the cab of the locomotive (Fig. 2). This cock may be set so as to allow air to pass along pipe 135 from main air reservoir along pipe 136 to re-setting cylinder 61 (Figs. 7 and 10) thereby forcing the piston 62 outward and releasing the pawl 58 from ratchet segment 56 allowing the valve 66 to be closed by spring 67.

The cock 134 is then set so as to connect the pipes 136 to atmospheric exhaust-opening 138 on the cock, thereby releasing the pressure in the re-setting cylinder and automatic register 74. The cock 134 cannot be set so as to establish direct communication between air reservoir and atmosphere.

Figure 1:
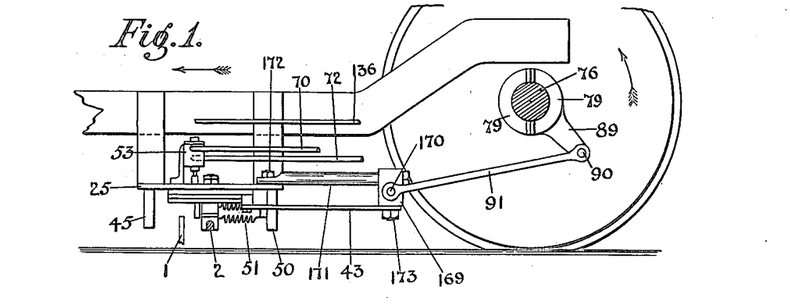
Figure 1 is a diagrammatic view of portion of the bogie frame and wheels of a locomotive showing the relative positions of the obstruction, the automatic exhaust valve, and the automatic direction control.

The action of the automatic air brake operator is as follows: Normally the piston is in the position shown in Fig. 16 and both top and bottom spaces between piston and cylinder casing are under fluid pressure from main reservoir, the top portion receiving its pressure direct from main reservoir through coupling inlet 123 the lower portion being in communication with the top portion by port or passage 129. The exhaust valve is thus under similar fluid pressure by means of the pipe 70 (Figs. 1 and 2).

As soon as the exhaust valve is opened the sudden release of pressure from same causes a reduction of pressure on the underside of the piston in the operator cylinder, and this piston descends without jerk to position shown in Fig. 17 thereby operating the bell crank 111 on its fulcrum pin 112 and causing the arm 118 to operate on the brass quadrant thereby partly rotating the sleeve 103 and the driver's air brake handle 99 and automatically releasing the air brake in the same manner as is ordinarily effected manually. The piston then remains in the position shown in Fig. 17 until it is drawn back to its normal position by the turning of the three-way cock 134 (Fig. 2) thus allowing the fluid pressure from main reservoir to operate on under side of piston 122 through coupling 123 and port 129.

In Figs. 13 and 14 are shown the registering apparatus, comprising clock and case 139, glass front 140, clock hour shaft 141, carrying rotating dial 142, prepared paper or metallic sheet disk 143, graduated in hours. Three studs 144, attach metallic paper disk to the aluminum dial. Zero is marked at 145 from which time is read. There is a small brass air or other fluid pressure cylinder 146 operating piston rod 147 and crank 148 and small spindle 149 running through an outer sleeve 150 which is operated by piston rod 151 and crank 152 from a brass pressure cylinder 153. Brass styles 154, 155 operate so as to make a mark on the metallic paper disk 143 when moved by the respective spindles 149 150 to which they are attached. 156 is a boss for the coupling to air pipe 136 from the re-setting cylinder, and 157 is a boss for coupling to air pipe 72 from exhaust valve. Lugs 158 are made to support case in the cab of the engine. Bearings 159 are supplied for the cranks and spindles. Fig. 15 shows a modified form of automatic register in which 139 is the metal casing, 141 the clock hour shaft, 142 aluminum dial, 143 metallic or paper disk. 144 studs attaching disk 143 to dial 142. 146 and 153 are the small brass cylinders with pistons 147 and 151, having rounded ends as shown. The styles 154, 155 are pivoted at 161, 162, and their bosses carry extensions 163 and 164. These extensions are forced to bear against the ball ends of the pistons 147 and 151 by the springs 165 and 166, which work against stops 167 and 168. When the pistons are forced outward by air pressure they move the extensions 163, 164, which being connected to the same bosses as the styles 154, 155 cause these styles to move from their normal positions. As soon as the pressure is released from the cylinders 146 and 153 the parts assume their normal positions.

The clock mechanism of the register continually causes the aluminum dials to revolve, and two regular lines are thus traced on the metallic paper disks by the styles, when the register is working under normal conditions. Should the registering device come into operation by the action of the exhaust valve or re-setting valve the corresponding style is deflected from its normal position and records these facts on the metallic paper disk.

Figure 4:
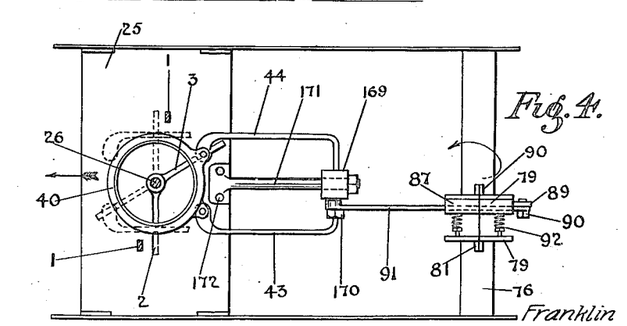
Fig. 4 is a diagrammatic view showing in plan the parts illustrated in Fig. 1 but omitting the exhaust valve and pipe connections thereto.
Figure 8:
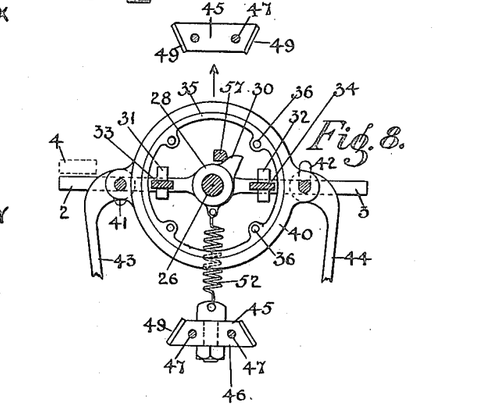
Fig. 8 is a sectional plan through Y—Y of Fig. 7.
Figure 9:
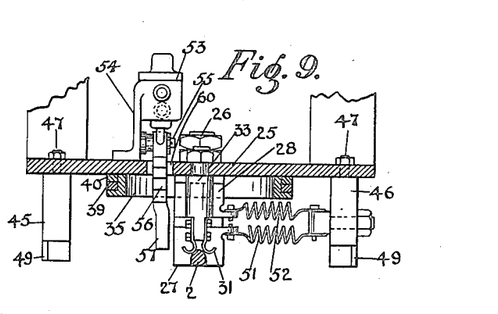
Fig. 9 is a side view of the parts shown in Fig. 8.

In order to describe the working of the various parts of this invention in combination it will be assumed that both obstructions are in their vertical or "danger" positions as illustrated in Fig. 3 and that the train is traveling "headon" as indicated by arrows (Figs. 1, 4 and 8). The axle 76 revolving in the direction as indicated rotates the arm 89 by means of the friction clutch device, to position as indicated in Figs. 1 and 4, thereby drawing the rods 43 and 44, and the striking arms 2 and 3 to position as indicated in Fig. 4. It will be seen that as the engine is traveling in direction of arrow (Fig. 4) the striking arm 2 will be in a position to strike the obstruction 1, whereas the striking arm 3 has been drawn clear of the corresponding obstruction. Should the engine start to run "tender first" the rods and arms will be caused to assume the positions as shown in dotted lines (Fig. 4) whereby the striking arm 3 becomes operative and the striking arm 2 is held clear of the obstruction. When one of the striking arms as 2 strikes the obstruction 1, it is caused to partially rotate about the spindle 26 (Figs. 7 and 8) thereby rotating the cam 29 moving the projecting arm 57 of ratchet segment, and lifting exhaust valve, thus allowing air from main air reservoir to pass through operator cylinder 71 along pipe 70, through exhaust valve 53 to warning whistle 73 and registering device 74 (Fig. 2).

What I claim as my invention and desire to secure by Letters Patent is:—

1. In an automatic safety controller for locomotives, the combination with an erectable flexible topped obstruction member located along a trackway and presenting a soft metal face to receive recording impressions, of a brake mechanism including a main brake pipe, an exhaust valve associated with said brake pipe and a striking arm associated with said valve and adapted to engage and impress on said soft metal face a record to identify the locomotive.

2. In an automatic safety controller for locomotives, the combination with a pair of erectable flexible warning obstructions located one on either side of the center of the trackway, said obstructions having detachably connected thereto a soft metal plate, of brake appliances carried by the locomotive and including a main air pipe, an exhaust valve normally closing said pipe and a lever arm associated with the valve and adapted to open the same upon contact of the lever arm with the said soft metal plate of either of the obstructions, whereby an identifying impression will be made on said soft metal plate to indicate a locomotive striking the obstruction.

3. In apparatus of the type described, the combination of a pair of obstacles located along the trackway on opposite sides of the center of the track, means to elevate the obstructions into striking position when desired, brake appliance carried by the locomotive and including a main air line, an exhaust valve normally closing said air line, a pair of striking arms associated with said exhaust valve, and means to selectively cause either of said arms to open said valve while the other arm remains inactive depending upon the direction of movement of the locomotive.

4. In apparatus of the character set forth, the combination of a pair of track obstructions associated with the switch or signal mechanism on opposite sides of the center of the track, brake mechanism carried by the locomotive and including an exhaust valve normally closing the brake air line, a pair of striking arms associated with said valve and adapted to engage the respective obstructions, and means made operative from the locomotive depending upon the direction of movement thereof to cause only the striking arm on the left side of the locomotive considered in the direction of motion to be effective.

5. In a safety appliance for locomotives, the combination of an air pressure pipe, an exhaust valve normally closing the same, said valve including a movable member, a rod coöperating with said movable member and having ratchet teeth, a pawl coöperating with said ratchet teeth to hold the rod and valve member in position to hold the valve open, means to actuate the rod when a danger point is passed, an audible signal adapted to be sounded by the air as it passes through said exhaust valve, and fluid pressure means under the control of the engineer to reset the devices by releasing the pawl from said ratchet, said means including an air line pipe, a manually controlled three-way cock therein and a piston operated from said air line pipe and engaging the pawl.

6. In a safety appliance for locomotives, the combination of a frame plate carried by the bogie truck at a constant elevation above the rails, a compressed air pipe, an exhaust valve normally closing said pipe and carried by said plate, said valve having a downwardly extending stem, an arm pivoted on a vertical pivot below the plate and laterally of the valve stem, means interposed between the valve stem and said arm whereby said arm when moved on its pivot will open said valve, and an obstruction located along the track and adapted when a danger point is reached to be struck by said arm, substantially as set forth.

7. In a safety appliance for locomotives, the combination of a frame plate carried by the bogie truck at a constant elevation above the rails, an obstruction located between the rails, a pair of striking arms mounted coaxially upon the lower part of said frame and extending laterally in opposite directions from their pivot, means extending between the bogie truck axle and said arms to selectively make one or the other of them operative upon striking said obstruction, depending upon the direction of movement of the locomotive, means whereby said exhaust valve may be opened from either of said arms, and means to reclose the valve.

8. In a safety appliance for locomotives, the combination of a bogie truck, a frame plate carried thereby at a definite elevation above the track rails, a compressed air line exhaust valve carried by said plate, a pivoted member below said valve and extending downwardly through the plate, an arm pivotally mounted below said plate and adapted to swing around a vertical axis adjacent said pivoted member whereby said member is swung on its pivot by said arm to open the valve, and means serving to normally hold said arm in position to extend laterally from its pivot.

9. In a safety appliance for locomotives, the combination with a bogie truck including a frame and axles, of a horizontal plate carried by said frame at a fixed elevation above the rails, a pair of striking arms pivoted below the frame plate, shiftable means associated with one of said axles whereby through the direction of rotation of said axle one or the other of said arms will be selectively made operative, and an exhaust valve adapted to be opened by either of said arms, substantially as set forth.

10. In a safety appliance for locomotives, the combination of a bogie truck including a frame and an axle, a plate carried by said frame at a definite elevation above the rails, a vertical pivot member secured to said plate and extending below the same, a pair of striking arms mounted on said pivot and extending normally laterally therefrom on opposite sides, a pair of rings surrounding and arranged concentrically with said pivot, a pair of fingers extending downwardly from the respective rings adjacent said arms, one in front of one arm and the other in the rear of the other arm, and means frictionally connected to said axle whereby according to the direction of rotation thereof one or the other of said arms will be swung around its pivot out of normal position.

11. In a safety appliance for locomotives, the combination of a compressed air pipe exhaust valve, means to support said valve at a definite distance above the level of the rails, a pair of striking arms journaled on the same axis adjacent said valve and adapted to open the same under certain conditions, a pair of rings journaled concentrically with said pivot, a pair of fingers extending downwardly from the respective rings into engagement with the several arms, one finger being in front of its arm and the other finger being in the rear of its arm, a yoke mounted frictionally upon an axle of the locomotive, said yoke being adapted to rotate through an arc of a circle when the direction of the locomotive is reversed, means to limit such rotation, means extending between said yoke and said rings to cause rotation of the rings in accordance with the rotation of the yoke at the aforesaid change of direction whereby one or the other of said arms will be thrown out of operating position, and means tending to hold the arms in mid position, substantially as set forth.

12. In a safety appliance for locomotives, the combination of a frame plate carried at a definite elevation above the rails, a brake air valve carried by said plate and including a reciprocating member, a pivoted rod below the valve and extending below the plate and adapted when moved to act upon the reciprocating member to open the valve, a fixed pivot extending below the plate, and a striking arm having a hub journaled on said pivot and extending thence laterally, said hub having a cam adapted to engage said rod when the arm is swung around its pivot in one direction.

13. In a safety appliance for locomotives, the combination of a supporting plate, means to carry said plate at a definite elevation above the rails, a pivot fixed to said plate and extending below the same, a pivoted member movable in a plane parallel to the axis of said pivot, a compressed air exhaust valve adapted to be opened by said member, a pair of arms having hubs journaled on said pivot, each arm hub having a lug adapted to actuate said member, means to hold said valve actuating member so as to maintain the valve open, and means to release said holding means.

14. The herein described automatic safety controller comprising, in combination, brake mechanism carried by the locomotive including a normally closed exhaust valve, a striking member to open said exhaust valve, said striking member being provided on its striking face with marks to identify the particular locomotive carrying the same, an obstruction located along a trackway, said obstruction comprising a member adapted to be struck by said striking arm and including a removable face plate of material adapted to be impressed by said individual character devices, means tending to normally hold said obstruction elevated, and means between said obstruction and a signal to remove it from the path of said arm when the track is clear.

15. In an automatic safety controller of the character set forth, the combination with an engineer's brake valve handle, of a compressed air motor adjacent said handle, said motor including a reciprocating piston, a bell crank between said piston and said handle and having slidable engagement with said piston, valve devices whereby the piston is normally held in position to not interfere with the usual action of the brake valve handle, and automatic means to release the air from beneath said piston to allow the air pressure to move the piston and actuate the brake valve handle to stop the train when a danger point is passed.

16. In an automatic safety controller of the character set forth, the combination with an engineer's brake valve handle, of a compressed air cylinder adjacent said handle, a piston adapted to reciprocate in said cylinder, said piston having a larger effective area on the bottom than on its top, means to supply compressed air to said cylinder and acting normally on both sides of the piston and holding it elevated, automatic means to relieve the pressure from below the piston allowing the regular pressure acting upon the top thereof to force the piston downwardly, and connections between said piston and the brake valve handle to cause actuation of the same automatically when a danger point is passed.

17. In an automatic safety controller of the character set forth, the combination with compressed air mechanism including an engineer's brake valve handle, of a compressed air cylinder adjacent said handle, a piston within the cylinder having a stem projecting through the upper end of the cylinder, means to maintain compressed air in the cylinder on opposite sides of the piston and serving to maintain the piston normally elevated, means acting through the lower end of the cylinder to determine the extent of movement downwardly of the piston, means to automatically relieve the pressure in the cylinder below the piston, allowing the piston to descend forcibly when a danger point is passed, and connections between the piston and the brake valve handle.

18. In an automatic safety controller of the character set forth, the combination of a pair of striking arms adapted to operate independently of each other, obstruction devices along the trackway to be engaged by said arms, brake mechanism adapted to be made operative from the movement of said arms, and direction control means to selectively make one or the other of said arms operative depending upon the direction of movement of the locomotive, said direction control means including a collar fixed to an axle, a yoke journaled on said collar and including a lever arm projecting outwardly from the axis of the axle, a second collar slidable upon the first mentioned collar into frictional engagement with said yoke and tending to cause rotation of the yoke with the axle, a guide adjacent the axle, means slidable along the guide and limited in its movement forwardly and rearwardly thereby, a connecting rod between said yoke arm and said sliding means, and connections between said sliding member and the respective striking arms whereby one or the other of said striking arms will be made ineffective depending upon the direction of rotation of the axle.

19. The combination with a pair of erectable warning obstructions located on either side of the center of a trackway and means carried by each obstruction to receive a record, of a brake mechanism carried by a locomotive and including a main brake pipe, an exhaust valve associated with said pipe, and a pair of striking arms associated with said valve and adapted to selectively engage the record means carried by one of said obstructions, to identify the locomotive.

20. The combination with a pair of erectable warning obstructions located one on either side of the center of the trackway and soft metal plates removably attached to said obstructions, of a brake mechanism carried by a locomotive and including a main brake pipe, an exhaust air valve associated with the brake pipe and a pair of striking arms associated with the said valve and adapted to selectively engage one of said arms and the aforesaid soft metal plates, whereby said plates are adapted to receive a record impression to identify the engaging locomotive.

In testimony whereof the said FRANKLIN GEORGE BARNES has signed his name to this specification in the presence of two subscribing witnesses.

FRANKLIN GEORGE BARNES.

Witnesses:
ALISON EAVIS HARDING,
EDWIN PHILIP NORMAN.